(12) United States Patent
Decker et al.

(10) Patent No.: US 7,015,811 B2
(45) Date of Patent: Mar. 21, 2006

(54) OBJECT MANAGEMENT

(75) Inventors: Christian Decker, Karlsruhe (DE); Albert Krohn, Karlsruhe (DE); Philip Robinson, Durlach (DE); Uwe Kubach, Waldbronn (DE); Michael Beigl, Karlsruhe (DE)

(73) Assignee: SAP Aktiengesellschaft, Walldorf (DE)

( * ) Notice: Subject to any disclaimer, the term of this patent is extended or adjusted under 35 U.S.C. 154(b) by 112 days.

(21) Appl. No.: 10/826,044

(22) Filed: Apr. 16, 2004

(65) Prior Publication Data
US 2005/0206520 A1 Sep. 22, 2005

Related U.S. Application Data

(63) Continuation-in-part of application No. 10/802,038, filed on Mar. 17, 2004.

(51) Int. Cl.
G08B 1/08 (2006.01)

(52) U.S. Cl. ............................ 340/539.22; 340/572.1; 340/545.6; 340/568.7

(58) Field of Classification Search ........... 340/539.22, 340/539.6, 539.26, 539.1, 585, 572.1, 545.6, 340/568.7; 702/128
See application file for complete search history.

(56) References Cited

U.S. PATENT DOCUMENTS 6,753,775 B1 * 6/2004 Auerbach et al. ....... 340/539.22
6,927,687 B1 * 8/2005 Carrender .............. 340/539.26
6,927,688 B1 * 8/2005 Tice ...................... 340/539.26

* cited by examiner

Primary Examiner—Anh V. La
(74) Attorney, Agent, or Firm—Fish & Richardson P.C.

(57) ABSTRACT

Techniques are provided for object management. In certain implementations, object management includes determining whether a signal representing the presence of at least one object to be monitored has been received and determining whether a signal representing the state of at least one object to be monitored has been received. If a signal representing the presence of at least one object to be monitored has been received, a determination is made as to whether a predetermined quantity of objects is present. If a signal representing the state of at least one object to be monitored has been received, a determination is made as to whether at least one object has a predetermined state.

45 Claims, 8 Drawing Sheets

OBJECT MANAGEMENT

RELATED APPLICATIONS

This application is a continuation-in-part of U.S. patent application Ser. No. 10/802,038, entitled "Document Management" and filed on Mar. 17, 2004.

TECHNICAL FIELD

This description relates to object management, and more particularly, to systems and methods for object management.

BACKGROUND

Goods are continuing to be shipped longer distances as economies and marketplaces continue to expand at national, international, and global levels. As goods are shipped longer distances, they are typically handled by more carriers, whether with the same company or with different companies. This provides increased opportunities for goods to be accidentally and/or surreptitiously lost and/or damaged. Additionally, it becomes more difficult to determine when the loss and/or damage occurred and who is at fault.

Various methodologies have been developed to assist in shipping goods. For example, position tracking sensors (e.g., Global Positioning System (GPS) sensors) are often attached to containers so that the location of goods may be determined and tracked. This assists in verifying the carriers who handled a container of goods, and possibly the goods themselves. However, it often does little to assist in understanding when goods in a container were lost and/or damaged, how the loss and/or damage occurred, and/or who is at fault.

SUMMARY

Techniques are provided for object management. In one general aspect, object management includes a method performed at an object monitoring system. The method may include determining whether a signal representing a presence of at least one object to be monitored has been received and determining whether a signal representing a state of at least one object to be monitored has been received. The method may also include determining, if a signal representing a presence of at least one object to be monitored has been received, whether a predetermined quantity of objects is present and determining, if a signal representing a state of at least one object to be monitored has been received, whether at least one object has a predetermined state. The predetermined quantity of objects and the predetermined object state may be expressed as rules. The method may be performed by a collection of electronic, optical, and/or other appropriate components, a machine-readable medium storing instructions operable to cause one or more machines to perform operations, and/or any other appropriate apparatus. An object monitoring system may include an object coupling device.

In particular implementations, the method may include sensing a presence of at least one object to be monitored and sensing a state of at least one object to be monitored. Sensing a presence of at least one object to be monitored may include receiving a response from at least one radio frequency identification transponder. Sensing a state of at least one object to be monitored may include detecting an environmental condition (e.g., temperature) in the vicinity of at least one object and/or detecting a location of an object. Determining whether at least one object has a predetermined state may include determining relative positions of objects. Also, determining whether at least one object has a predetermined state may include determining an environmental condition in a vicinity of at least one object.

Certain implementations may include determining whether monitoring should continue. Monitoring may, for example, be discontinued if a predetermined period of time expires.

Some implementations may include determining the predetermined quantity of objects and the predetermined object state by sensing a presence of at least one object to be monitored and sensing a state of at least one object to be monitored. Particular implementations may include determining whether a signal indicating the predetermined object state has been received and, if the signal has been received, determining the predetermined object state based on the signal.

Certain implementations may include wirelessly communicating data. Sending data may include authenticating a destination before sending data thereto. Sent data may include the quantity of objects present and the state of at least one object. Also, sent data may include an alert indicating that at least one monitored object does not have a predetermined status. Received data may include an allowable object status. Additionally, sent data may include an object status request, and received data may include an indication of a quantity of objects sensed by a second object monitoring system.

Certain implementations may include a second object monitoring system. The second object monitoring system may receive an object status request, sense a presence of at least one object to be monitored, determine whether a predetermined quantity of objects is present, and send object status.

In another general aspect, a system for object management includes an object monitoring system. The object monitoring system may include a first sensor system, a second sensor system, a computer, and a wireless communication device. The first sensor system is operable to sense a presence of at least one object to be monitored and to generate a signal representative thereof The second sensor system is operable to sense a state of at least one object to be monitored and to generate a signal representative thereof. The second sensor system may, for example, detect an environmental condition in a vicinity of at least one object. The computer is coupled to the first sensor system and the second sensor system, and is operable to determine whether a signal representing a presence of at least one object to be monitored has been received and, if a signal representing a presence of at least one object to be monitored has been received, determine whether a predetermined quantity of objects is present. The predetermined quantity of objects may be expressed as a rule. The computer is also operable to determine whether a signal representing a state of at least one object to be monitored has been received and, if a signal representing a state of at least one object to be monitored has been received, determine whether at least one object has a predetermined state. The predetermined object state may be expressed as a rule. The wireless communication device is coupled to the computer, and is operable to send data from and receive data for the computer. Received data may include the predetermined object state, and sent data may include an alert indicating that at least one monitored object does not have a predetermined status. The object monitoring system may include an object coupling device.

The computer may determine the predetermined quantity of objects and the predetermined object state based on signals from the sensor systems. Also, the computer may authenticate a destination before sending data thereto.

The object management system may include a second object monitoring system. The second object monitoring system may include a sensor system operable to sense the presence of at least one object to be monitored and to generate a signal representative thereof and a computer coupled to the sensor system. The computer may be operable to determine whether a predetermined quantity of objects is present. The second object monitoring system may also include a wireless communication device coupled to the computer. The second object monitoring system may be operable to send data from and receive data for the computer. The received data may include an object status request and the sent data may include object status.

Various implementations may have one or more features. For example, by allowing the definition of a group of objects that are to remain together and monitoring their presence, it can be proved that all objects of a unit have remained together, and, hence, the integrity of the unit may be authenticated, as well as one of more objects. The ability to validate the authenticity of the objects may be used by transporters to prove that the appropriate objects have been delivered. As another example, by allowing the definition of allowable states for the objects and monitoring the states, the integrity of the objects may be validated. Being able to validate the integrity of the objects may be used by transporters to prove that objects have been delivered in an appropriate condition. Additionally, being able to validate the authenticity and/or the integrity of the unit and/or the objects may be used by shippers to prove compliance with contractual requirements.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Object management includes monitoring objects to verify their authenticity and/or integrity. In particular implementations, object management includes monitoring the presence of objects in a container and at least one state of the objects. If one of the objects leaves the container or enters into an undesired state, an alert is generated. Thus, the container's recipient can determine the authenticity and integrity of the objects. Object management may, however, also be accomplished by a variety of other techniques.

Figure 1:
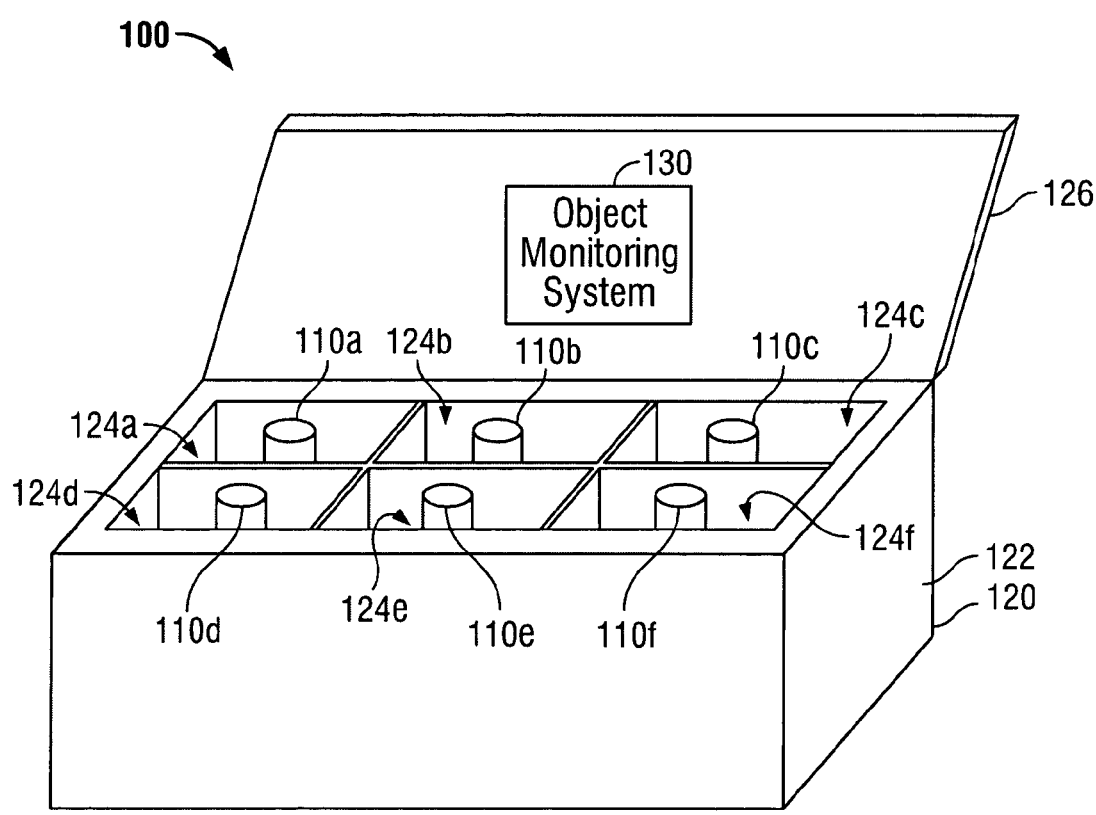
FIG. 1 is a diagram illustrating a system for object management.

FIG. 1 illustrates one example of a system 100 for managing objects 110 (shown as objects 110$a$–110$f$). System 100 may be particularly useful for managing objects 110 as they are transported. To assist in managing objects 110, system 100 includes a container 120 and an object monitoring system 130. Container 120 groups and protects objects 110, and object monitoring system 130 monitors the status of the objects. The status of the objects includes the presence of the objects in container 120 and at least one state of at least one object. The status may be monitored autonomously by object monitoring system 130. When objects 110 arrive at their destination, or at any other appropriate point in the transportation process, such as, for example, a checkpoint, object monitoring system 130 provides the status of the objects, and possibly a history of the objects' status.

In more detail, objects 110 may be any appropriate physical items. As illustrated, objects 110 are containers for holding liquids. In other implementations, however, the objects may hold any other appropriate substance. Additionally, the objects need not be containers for substances. The objects may, for example, be raw and/or finished materials or devices. Objects 110 may be made of metal, plastic, wood, composite, and/or any other appropriate material. Furthermore, objects 110 may be of any appropriate size and shape, as long as they fit within container 120.

Container 120 includes a base 122 and a cover 126. Base 122 includes compartments 124 for objects 110. Compartments 124 may include appropriate mechanisms for securing objects 110 therein. Cover 126 is movably coupled to base 122 to allow objects to be inserted into and removed from compartments 124. As illustrated, cover 126 is in the opened position. When cover 126 is in the closed position, objects 110 are enclosed in container 120. Container 120 may be of any appropriate size and shape. Furthermore, container 120 may be made of metal, plastic, wood, composite, and/or any other appropriate material.

Object monitoring system 130 is coupled to cover 126 and is responsible for monitoring the status of objects 110. For this implementation, the status of the objects includes their presence in the container and at least one state of at least one object.

To monitor the presence of the objects, object monitoring system 130 may use any of a variety of techniques. For example, each object 110 could be equipped with a radio frequency identification (RFID) transponder and read with one or more RFID readers. In operation, the transponders could be interrogated on a periodic, aperiodic, event-driven, or other appropriate basis. The initial set of RFID transponders may be identified by a set of identifiers (IDs) $\{ItemID_0, ItemID_1, \ldots, ItemID_n\}_{t=0}$. Later readings of the RFID transponders $\{ItemID_0, ItemID_1, \ldots, ItemID_n\}_{t>0}$ may be compared to the initial reading to determine whether any transponders are missing. If all transponders respond, the items are assumed to still be present. If, however, a transponder does not respond, which most likely indicates that the object is missing, an alert may be raised.

As another example, object monitoring system 130 may be able to image (e.g., digitally photograph) objects 110. To accomplish this, object monitoring system 130 may include an imaging device, which may include a photocell, a bolometer, a photosensor, a charge-coupled device, or any other appropriate radiation sensing apparatus. Note that the imaging device need not operate in the visible light band. For example, it may operate in the infrared (IR) band.

In operation, the images may be taken on a periodic, aperiodic, event-driven, or other appropriate basis. If an object does not appear in an image, which most likely indicates that the object is missing, an alert may be raised. The images may be compared by using any appropriate pattern matching technique.

In certain implementations, the status of the objects may also include the order of the objects. The order may be determined using tagging, imaging, or any other appropriate technique. If the object order has unexpectedly changed, an alert may be generated.

To monitor one or more states of an object, object monitoring system 130 may include any appropriate environmental sensor. For example, object monitoring system 130 may include a temperature sensor, such as, for example, a resistive temperature device or a thermocouple. Other environmental conditions that may be monitored include illumination, sound, vibration, orientation, movement, location, and radiation. For illumination, a photocell, a bolometer, a photosensor, a charge-coupled device, or any other appropriate light sensing device may be used. For sound, a microphone or any other appropriate sound sensing device may be used. For vibration, orientation, and/or movement, an accelerometer, a gyroscope, or any other appropriate motion sensing device may be used. For location, a GPS receiver, a base station monitor, a bar code scanner, or any other appropriate position sensing device may be used. For radiation, a bolometer, a Geiger counter, a Scintillometer, or any other appropriate radiation sensing device may be used. The environmental conditions around an object, which affect the state of the object because they define the environment that interacts with the object, may be monitored by sensors coupled to the object and/or in the vicinity of the object.

As another example of monitoring a state of an object, objecting monitoring system 130 may be able to monitor a property of an object. For instance, by using imaging, the system may determine whether a structural deformation has occurred. Additionally, sensors may detect internal properties (e.g., temperature, pressure, density, or viscosity) of an object.

The object(s) and the object state(s) to be monitored may be defined at the object monitoring system or a remote device. The object(s) and the state(s) to be monitored, in effect, define a seal for the object(s). In general, a seal may be one or more conditions that are monitored. The conditions may be expressed as rules. Once defined, object monitoring system 130 may autonomously monitor the object(s). If an object status indicator is within bounds, the seal is valid, but if an object status indicator is out of bounds, the seal is broken. For the latter, an alert may be generated. Object status data may be obtained from object monitoring system 130 upon request, at predetermined times, or upon the occurrence of a predetermined event. Data may be sent to and/or received from the object monitoring system by wireline or wireless techniques.

System 100 has a variety of features. For example, by allowing the definition of a group of objects that are to remain together and monitoring their presence, the system can be used to prove that all objects of a unit have remained together, and, hence, the integrity of the unit, as well as to prove the authenticity of one or more objects. The ability to validate the authenticity of the objects may be used by transporters to prove that the appropriate objects have been delivered. As another example, by allowing the definition of allowable states for the objects and monitoring the states, the system can be used to validate the integrity of the objects. Being able to validate the integrity of the objects may be used by transporters to prove that the appropriate objects have been delivered in an appropriate condition. Additionally, being able to validate the authenticity and/or the integrity of the unit and/or the objects may be used by shippers to prove compliance with contractual requirements.

System 100 may have applicability in a variety of situations. For example, system 100 may be used in storehouses, supply-chain management, office document management, and office document production. Also, system 100 may be useful in non-transportation situations (e.g., storage).

In certain implementations, a variety of integrity types may be used. Examples different types of integrity include conditional integrity, relational integrity, authorization integrity, and environmental integrity. Conditional integrity is upheld when an object's physical properties remain unaltered or undamaged. In this case, full access to a sealed object may be allowed, in that the object may be used, but it is forbidden to change the properties of the object. Relational integrity is similar to conditional integrity, but considers the orientation and relation of constituent objects. Relational integrity is violated when someone adds or removes something from a sealed object collective. Also, an object may include several constituent components, like, for example, a palette of goods includes several goods. Authorization integrity is similar to classic wax-seal integrity, in which no unauthorized party is allowed visual or tangible access to a sealed object. Integrity is broken if someone is able to observe a defined state (e.g., internal information), or even the outline of the object. Beyond the "open the container and look" integrity violation, modern forms of spying include x-ray scans and methods to get access to internal information (e.g., stored programs and data) of an object. Environmental integrity is violated if the environmental conditions surrounding an object are unfavorable (e.g., the object is brought into a place where it should not be, or the environment external to the object is not in a tolerable range for the object). These classes of integrity may often have to be addressed in tandem. For example, a policy could exist that includes access restriction (i.e., Authorization Integrity) and that the object's structural properties must not be changed (i.e., Conditional Integrity). Other integrity scenarios could also be defined.

Although FIG. 1 illustrates a system for object management, other implementations may include fewer, additional, and/or a different arrangement of components. For example, a system for object management may manage any number of objects. As another example, a system for object management may have the object monitoring system mounted at any appropriate location (e.g., in the proximity of, on, or in an object) for sensing object status. As an additional example, a system for object management may not include a container. The objects may, for instance, be bound together, or even have no coupling therebetween. As a further example, a system for object management may include more than one object monitoring system. This may provide redundancy in case one of the monitoring systems fails and/or additional security.

Figure 2:
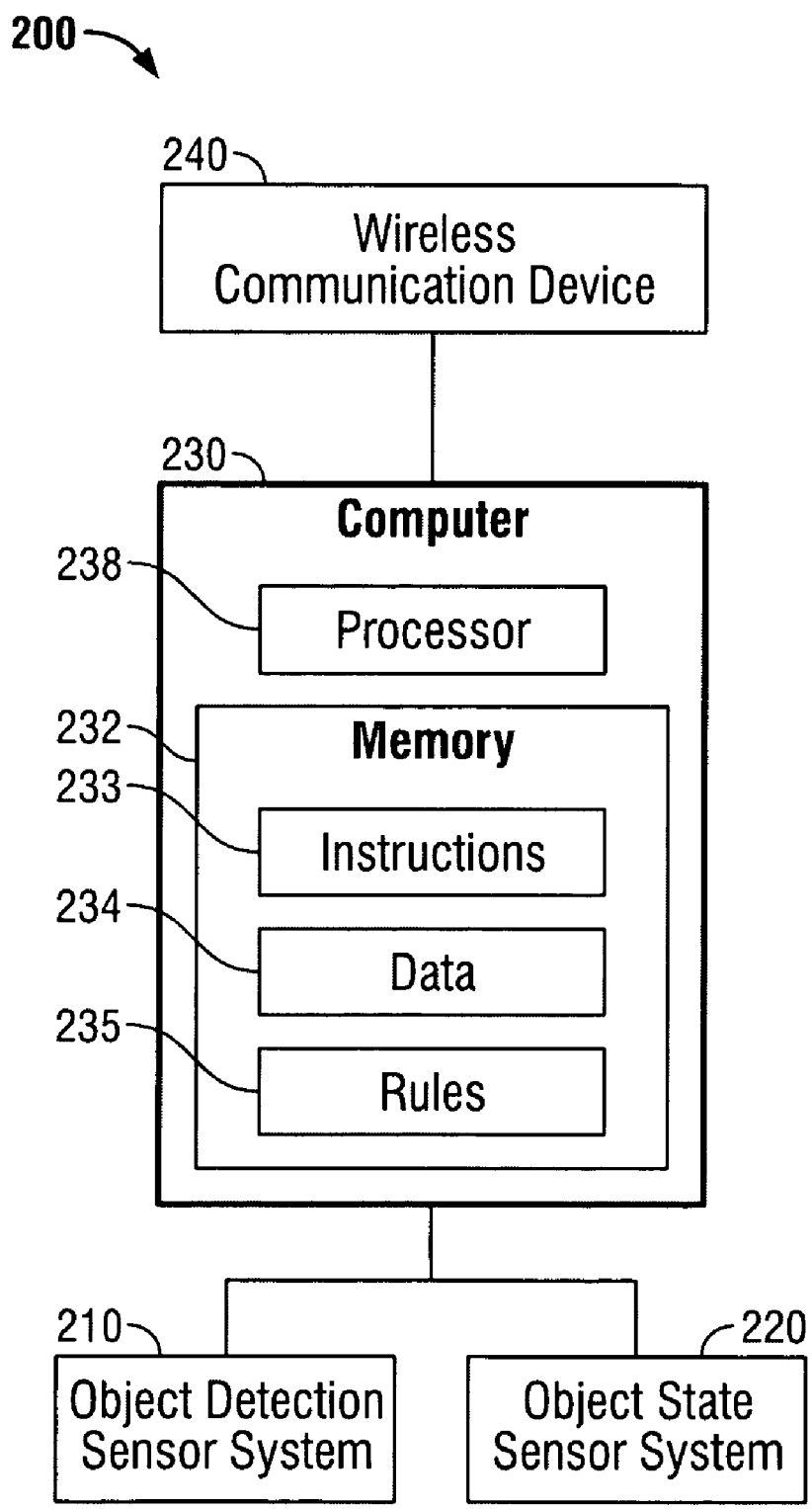
FIG. 2 is a block diagram illustrating one example of an object monitoring system for use with the system in FIG. 1.

FIG. 2 illustrates an object monitoring system 200. Object monitoring system 200 is one example of object monitoring system 130 in FIG. 1.

Object monitoring system 200 includes an object detection sensor system 210, an object state sensor system 220, a computer 230, and a wireless communication device 240. Object detection sensor system 210 senses the presence of an object, and object state sensor system 220 senses the state of an object. The detections of the object detection sensor system and the object state sensor system are relayed to computer 230, which determines the quantity of objects present and the object state. Computer 230 also compares the quantity and state against an allowable quantity and state. If an unexpected quantity or state is present, the computer generates an alert. Wireless communication device 240 is coupled to computer 230 and receives and sends data for computer 230. The sent data may include the alert.

In more detail, objection detection sensor system 210 may be any appropriate device for sensing the presence of an object. For example, object monitoring system 200 may use RFID or imaging techniques to sense the presence of an object.

Similarly, object state sensor system 220 may be any appropriate device for sensing a state of an object. For example, object state sensor system 220 may sense temperature, vibration, movement, and/or orientation of an object and/or an object environment.

Computer 230 includes memory 232 and a processor 238. Memory 232 may include flip-flops, random access memory (RAM), read-only memory (ROM), compact-disc read-only memory (CD-ROM), registers, and/or any other appropriate device for storing information. Memory 232 includes instructions 233, data 234, and rules 235. Instructions 233 are logical procedures that dictate the operation of processor 238. Instructions 233 may, for example, include an operating system and an application program. Data 234 includes information regarding object status, and rules 234 are logical expressions of the allowable status of objects. A rule, for example, may express an allowable temperature range for an object environment (e.g., $20° C. \leq T \leq 40° C.$). Processor 238 may be a reduced instruction set computer (RISC), a complex instruction set computer (CISC), a field programmable gate array (FPGA), or any other appropriate device for manipulating information in a logical manner.

Wireless communication device 240 may be any appropriate device for wirelessly sending and receiving information. Wireless communication device 240 may, for example, operate in the radio frequency (RF) regime and be a wireless interface card for a local area network (e.g., IEEE 802.11 or Bluetooth™). As another example, wireless communication device 240 may be a wireless modem for a wide area network (e.g., a cellular network using IS-95 or IS-136). Wireless communication device 240 may also operate in other electromagnetic frequency regimes (e.g., IR).

In one mode of operation, computer 230 receives data through wireless communication device 240 regarding a set of objects to monitor. The information may include the number of objects to be monitored, the object state(s) to be monitored, and/or any other appropriate information. The number of objects and the object state(s) to be monitored are expressed as rules 235.

Once computer 230 understands the appropriate status of the objects to be monitored, system 200 begins monitoring the objects using object detection sensor system 210 and object state sensor system 220. Object detection sensor system 210 and object state sensor system 220 may perform their detections continuously, periodically, when commanded by computer 230, or at any other appropriate time. Object detection sensor system 210 and object state sensor system 220 are not required to perform their detections at the same time.

When object detection sensor system 210 performs a detection, the sensor system generates a signal representing the detection, and the signal is received by computer 230. The signal may be conditioned (e.g., amplified, filtered, and digitized) by object detection sensor system 210, computer 230, or an intermediate device. When computer 230 determines that it has received the signal, processor 238, operating under the direction of instructions 233, determines the number of sensed objects. The number of sensed objects is stored as data 234, along with a time indication. Processor 238 also checks the number of sensed objects against the allowable number of objects expressed in rules 235. If the number of sensed objects is appropriate, the processor waits for another detection. If, however, the number of sensed objects is not appropriate, the processor generates an alert. The alert is stored as data 234. The number of sensed objects and any alerts may be retrieved from data 234 through wireless communication device 240.

When object state sensor system 220 performs a detection, the sensor system generates a signal representing the detection, and the signal is received by computer 230. The signal may be conditioned (e.g., amplified, filtered, and digitized) by object state sensor system 220, computer 230, or an intermediate device. When computer 230 determines that it has received the signal, processor 238, operating under the direction of instructions 233, determines the sensed object state. The sensed object state is stored as data 234, along with a time indication. Processor 238 also checks the sensed object state against the allowable object state(s) expressed in rules 235. If the sensed object state is appropriate, the processor waits for another detection. If, however, the sensed object state is not appropriate, the processor generates an alert. The alert is also stored as data 234. The sensed object state and any alerts may be retrieved from data 234 through wireless communication device 240.

System 200 may monitor objects (e.g., sensing objects and object states, determining and recording the number of sensed objects and the object states, and checking rules) for any appropriate period. For example, system 200 may continue monitoring for a predetermined length of time, until a predetermined event occurs (e.g., first generated alert), or until receiving a command to stop monitoring, possibly through wireless communication device 240.

In certain implementations, system 200 may communicate using encryption techniques. Encryption allows data of the object monitoring system to remain confidential. Encryption may also allow system 200 to authenticate systems attempting to communicate with it and system 200 to be authenticated by other systems. Being able to authenticate system 200 may further authenticate the monitored objects.

Because computer 230 most likely contains the most sensitive data, it may be the most valuable target to attack. In certain implementations, computer 230 may be strengthened against invasive or non-invasive methods gaining knowledge of the computer's internal states. Also, the computer may hold states that cannot be reproduced once lost. Such states may include the object monitoring system's state and the integrity of the computer itself. The states may be wiped out as soon as a seal breach or attack is detected. Thus, the seal cannot be reestablished. Two processors that may facilitate achieving these goals are the DS5002FP from Dallas Semiconductor and a processor based on the IBM 4758 architecture. Both support countermeasures against non-invasive attacks and provide protection against invasive attacks using physical shielding. In particular implementations, the software layers may also be protected.

For the wireless communication device, security may be provided by higher level protocols. Also, a destruction of the communication device or a denial-of-service attack, which may prevent a receiver from reading the seal state, could be viewed as the monitoring system being absent.

The sensors may also face attacks, including manipulating of sensor values during their transport to the computer and sensor cheating. In the latter case, the attacker tries to maintain the valid sensor conditions during the attack through creating the environment in which the sensor is situated. In order to combat attacks to the data transport from sensors 210, 220 to computer 230, the transport may be protected by physical protection such as shielding of the cables and the sensor itself or by the user of cryptographic protocols for the data transmission. An example of the latter is the Next Generation Secure Computing Base enabled computer. To combat sensor cheating, the computer may regularly check the sensors' status. This may require the sensors to record their own operation condition using further internal sensors. This sensor-watches-sensor scenario may be replaced by a seal-watches-sensor scenario in which an object monitoring system can be supported by neighboring devices in order to verify its own reading. The physical arrangement of the goods to be sealed may also protect the sensors. These considerations may need to be made before initializing the seal, because they may depend on the type of goods to seal and the expected attacks.

Object monitoring system 200 may have a variety of features. For example, it may be mobile. For instance, it may be small and operate without external connections (e.g., power and communication). As another example, object monitoring system may be versatile. Because goods have different physical properties, like size, shape, and weight, and experience different environmental conditions, different objects may have a different object status that needs to be monitored. Object monitoring system 200 may provide a flexible platform to realize a seal for various objects and environments. As an additional example, because objects can move through various locations and environments, external support cannot be guaranteed in all instances. Object monitoring system 200 may, however, be able to operate autonomously for extended periods of time.

Although FIG. 2 illustrates an object monitoring system, other implementations may include fewer, additional, and/or a different arrangement of components. For example, an object monitoring system may include an input device (e.g., button, keypad, or keyboard) and a display device (e.g., LCD). These may be used to input information (e.g., rules and commands) into the system and to view information (e.g., rules, data, instructions, and operating status) in the system. As another example, an object monitoring system may not include a wireless communication device. Such a system may be programmed directly at the system and also provide information thereat. Wireline techniques could also be used. As an additional example, an object monitoring system may include multiple object detection sensor systems and/or multiple object state sensor systems. As a further example, the rules may be part of the instructions. Moreover, at least some of the instructions may be encoded on the processor.

Figure 3:
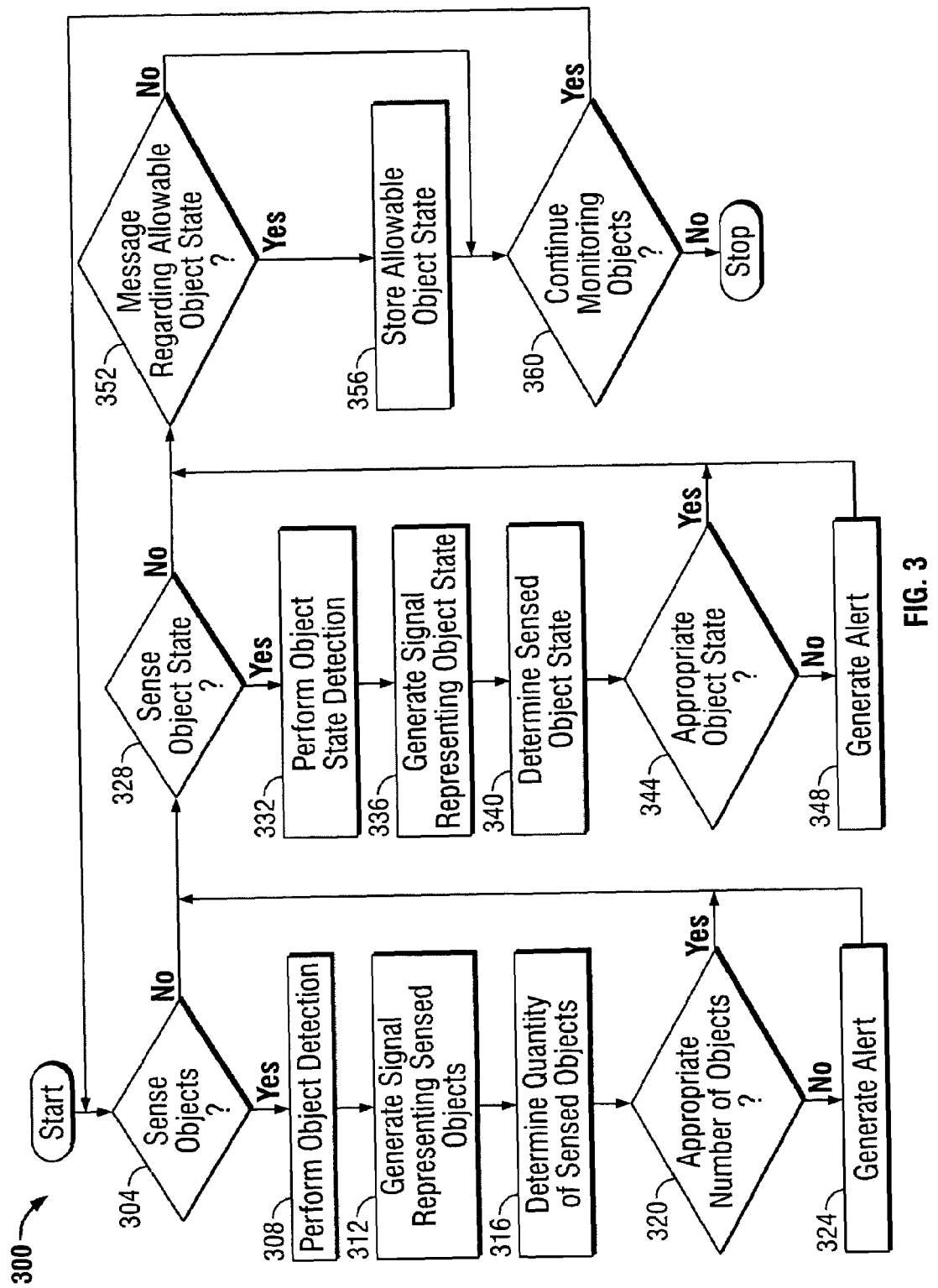
FIG. 3 is a flowchart illustrating a process for object management.

FIG. 3 illustrates a process 300 for object management. Process 300 may describe the operations of an object monitoring system similar to object monitoring system 200 of FIG. 2.

Process 300 begins with determining whether objects should be sensed (operation 304). Objects should be sensed, for example, if a predetermined period of time has expired. If objects should be sensed, the process calls for performing an object detection (operation 308). An object detection may, for example, be performed using an RFID reader or a camera. The process continues with generating a signal representing the sensed objects, if any (operation 312). The signal may, for example, be sent to a computer for analysis. The process also calls for determining the quantity of sensed objects (operation 316). The quantity may, for example, be determined by calculating the number of unique responses received to a request.

The process continues with determining whether an appropriate number of objects is present (operation 320). Determining whether an appropriate number of objects is present may, for example, be accomplished by determining whether the number of sensed objects corresponds to an expected number of objects. The expected number of objects may, for instance, be expressed in a rule. If an appropriate number of objects is not present, the process calls for generating an alert (operation 324). The alert may be recorded as an appropriate indicator in a memory and/or wirelessly transmitted.

After generating the alert, or if the appropriate number of objects is present, or if objects should not be sensed, the process calls for determining whether an object state should be sensed (operation 328). An object state should be sensed, for example, if a predetermined period of time has expired. If an object state should be sensed, the process calls for performing an object state detection (operation 332). An object state may, for example, be sensed by a temperature sensor. The process also calls for generating a signal representing the sensed object state (operation 336). The signal may, for example, be sent to a computer for analysis. The process additionally calls for determining the object state (operation 340). The object state may, for example, be determined by evaluating a formula or a table based on the signal representing the object state.

The process continues with determining whether the object state is appropriate (operation 344). Determining whether the object state is appropriate may, for example, be accomplished by determining whether the object state is within the tolerance of an expected object state. The appropriate object state may, for example, be expressed in a rule. If the object state is not appropriate, the process calls for generating an alert (operation 348). The alert may be recorded as an appropriate indicator in a memory and/or wirelessly transmitted.

After recording the alert, or if the object state is appropriate, or if an object state should not be sensed, the process calls for determining whether a message regarding an allowable object state has been received (operation 352). The allowable object state may, for example, be expressed as a rule. If a message regarding an allowable object state has been received, the process calls for storing the allowable object state (operation 356).

The process also calls for determining whether object monitoring should continue (operation 360). Monitoring may, for example, be discontinued if a predetermined period of time has expired, a predetermined event has occurred, or an appropriate command has been received. If monitoring should continue, the process calls for returning to determine whether objects should be sensed (operation 304). The process may cycle through operation 304, operation 328, operation 352, and operation 360 any number of times.

Although FIG. 3 illustrates one implementation of a process for object management, other implementations may include fewer, additional, and/or a different arrangement of operations. For example, a process may involve determining the appropriate number of objects. This may accomplished by performing an initial object detection, determining the number of objects present, and using this number as the appropriate number. Additionally, this may be accomplished by receiving an indication of the appropriate number of objects. The appropriate object state(s) may be determined similarly. As another example, a wireless message representing an alert may be generated. As a further example, the allowable object state(s) may not be updated. As an additional example, performing the object detection and the object state detection may be performed in any order, or even simultaneously. As another example, an object detection and/or an object state detection may be performed without determining whether they should be performed.

Figure 4:
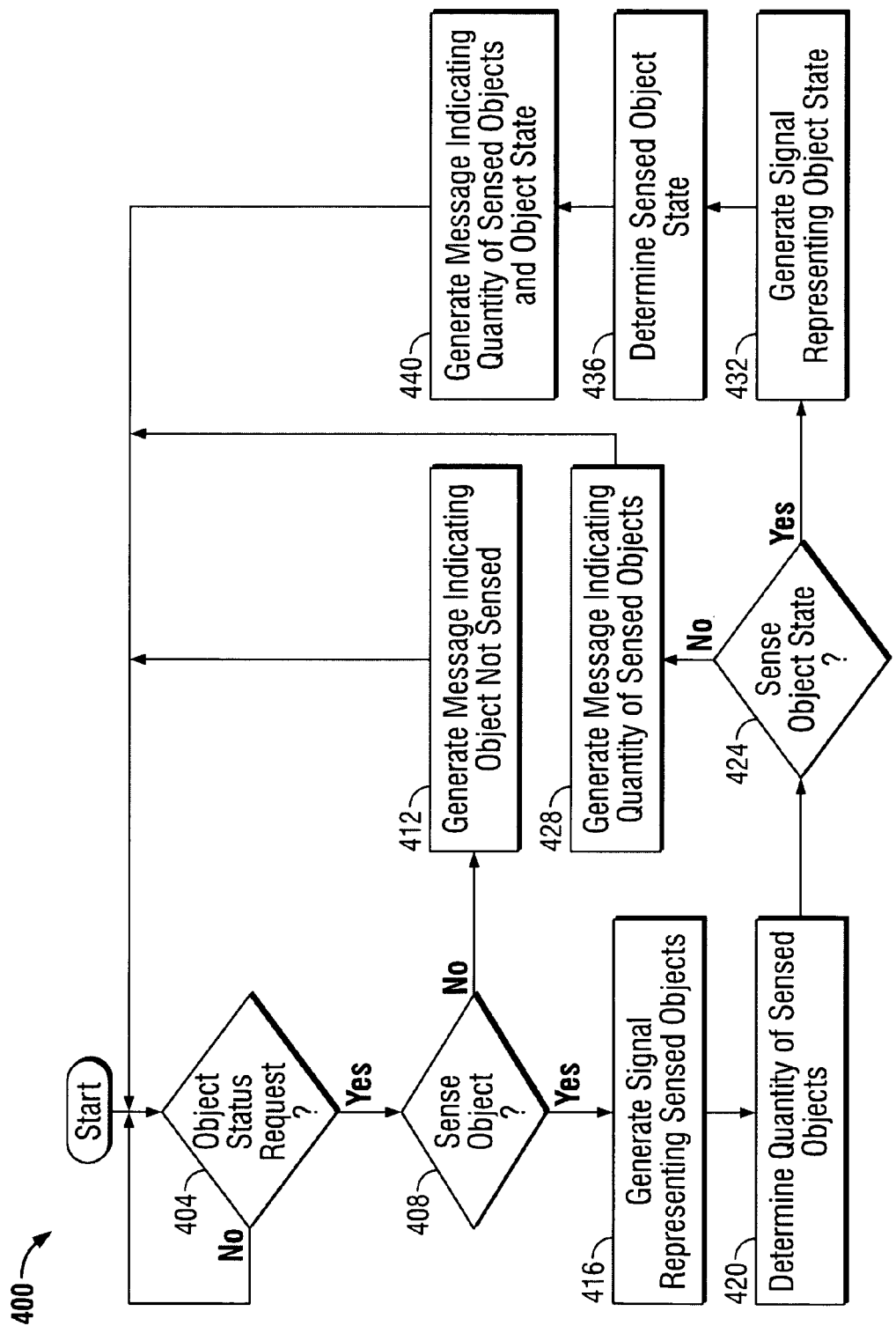
FIG. 4 is a flowchart illustrating a process for object management.

FIG. 4 illustrates a process 400 for object management. Process 400 may describe the operations of an object monitoring system similar to object monitoring system 200 of FIG. 2. Additionally, process 400 may be used in conjunction with process 300 of FIG. 3.

Process 400 begins with determining whether a request for object status has been received (operation 404). If an object status request has been received, the process calls for determining whether at least one object is sensed (operation 408). If an object is not sensed, the process calls for generating a message indicating that an object was not sensed (operation 412). An object may not be sensed, for example, if a query is issued and no response is received. The process then calls for waiting for another object status request (operation 404). If, however, an object is sensed, the process calls for generating a signal representing the sensed object(s) (operation 416) and determining the quantity of the sensed objects (operation 420).

The process continues with determining whether a state of at least one object is sensed (operation 424). If an object state is not sensed, the process calls for generating a message indicating the quantity of the sensed objects (operation 428). The process then calls for waiting for another object status request (operation 404). If, however, an object state is sensed, the process continues with generating a signal representing the object state(s) (operation 432) and determining the sensed object state(s) (operation 436). The process also calls for generating a message indicating the quantity of the sensed objects and the sensed object state(s) (operation 440). The process then calls for waiting for another object status request (operation 404).

Although FIG. 4 illustrates one implementation of a process for object management, other implementations may include fewer, additional, and/or a different arrangement of operations. For example, a process for object management may not include waiting for an object status request. Object status may, for instance, be provided at a predetermined time or upon the occurrence of a predetermined event. Also, determining object status may be performed according to a different procedure than reporting object status. For instance, object status may be determined on a first interval, but reported on a second, typically longer, interval. As another example, a process for object management may include generating a message indicating that an object state is not sensed if an object state is not sensed. As a further example, a process for object management may include generating a message representing the signals. As an additional example, a process for object management may not include determining whether an object has been sensed before generating a signal representing the sensed object(s). This may, for example, occur if imaging techniques are used. As a further example, a process for object management may include sensing an object state even if no objects are present. This may be useful, for example, if environmental conditions are being monitored.

Figure 5:
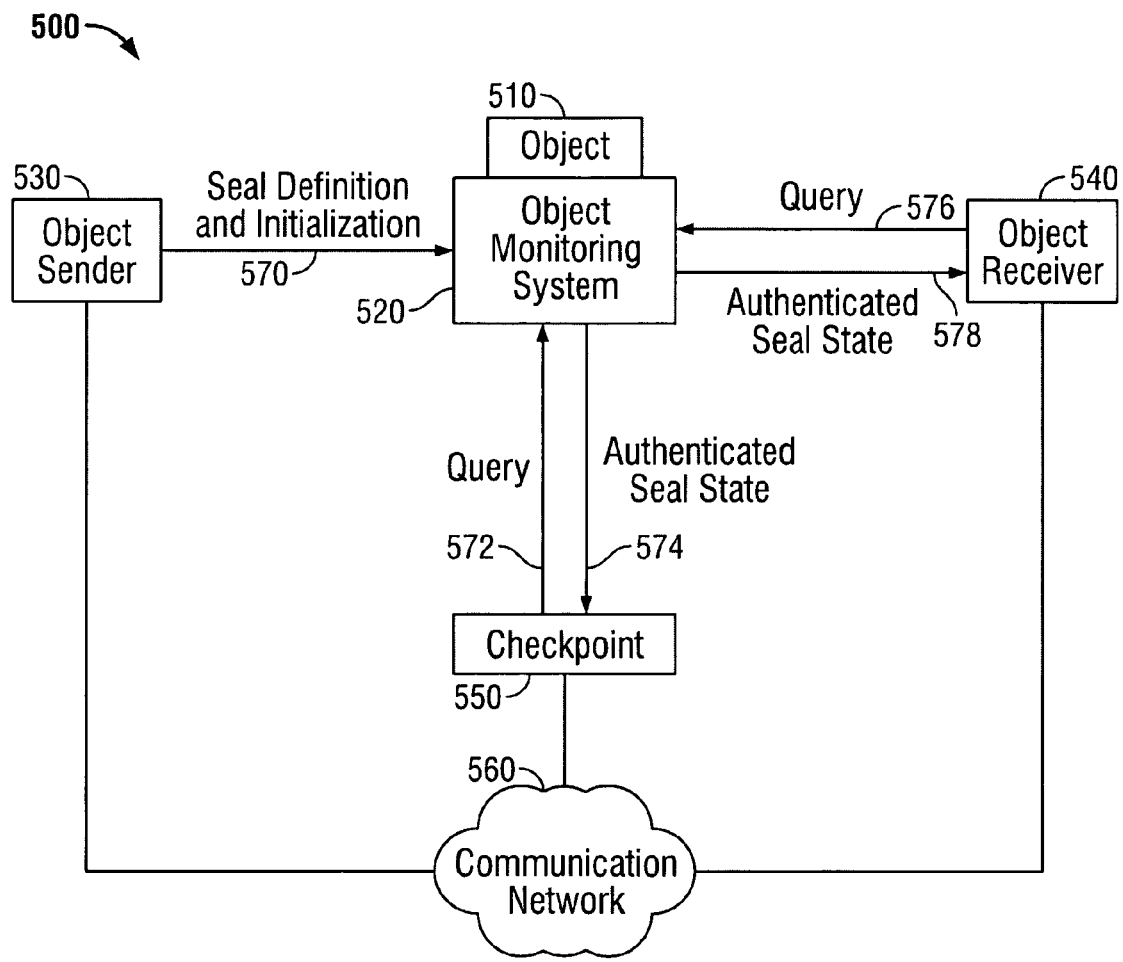
FIG. 5 is a block diagram illustrating another object management system.

FIG. 5 illustrates an object management system 500 for an object 510. Object management system 500 includes an object monitoring system 520, an object sender 530, an object receiver 540, and a checkpoint 550. Object 510 may be any appropriate object.

Object monitoring system 520 may be any appropriate apparatus for monitoring the presence and at least one state of object 510. For example, object monitoring system 520 may be similar to object monitoring system 200.

Object sender 530, object receiver 540, and checkpoint 550 may, for example, be personal computers. Communication between object monitoring system 520 and the object sender, the object receiver, and the checkpoint may be accomplished by an Xbridge device, which may act a wireless gateway between the object monitoring system and the Internet, to which the object sender, the object receiver, and the checkpoint may be coupled.

A variety of protocols may be used for initiating and verifying the authenticity of object monitoring system 520. For authenticity, object receiver 540 may want to know that object 510 was really sent from object sender 530 and that the object is a genuine article, including that the object data also conforms to these properties. Threats may include a false object sender sending an object bearing the real object sender's identity (source masquerading), the object or its associated data being replaced in transit by a falsified object or falsified data (replay attack), and a false object monitoring system sending out object status data to the object sender and/or object receiver. For integrity, the object sender and the object receiver may want to know that the object, as well as its associated data, is not tampered with while in transit and that the correct handling policies were upheld. Threats may include that the object was tampered with while left unattended or by an authorized third party, thereby degrading quality of the object, and that the object was subjected to transit conditions that violated its handling policy.

Other threats may include denial-of-service attacks through communication signal interference or continuous depletion of power resources. Also, for highly sensitive data on the seal, confidentiality becomes another protection goal. The communication protocol and power management features of the object monitoring system may address the denial-of-service attacks, while confidentiality may be captured within the properties of crypto protocols and physical handling policies.

Table 1 illustrates a set of security functions and elements that may be used to address at least some of these concerns. The protocol based on these functions and elements allows protection goals to be captured between interacting entities. Using these functions and elements, a seal may be established, monitored, and authenticated.

TABLE 1

| Variable | Definition |
|---|---|
| $K_X$ | Public key of an entity X |
| M: | Query and status messages |
| n, q | Initial random sequence number, and sequence counter |
| P: | Handling policy |
| $D_X\{\ \}$: | Decryption with private key of entity X |
| $E_X\{\ \}$: | Encryption with public key of entity X |
| $H\{\ \}$: | Hash function |
| $S_X\{\ \}$: | Signing with private key of entity X |
| $V_X\{\ \}$: | Verification of signature with public key of entity X |

For example, object receiver 540 may send an order request message ($M_n$) with which object sender 530 can initialize a seal session. To avoid replay attacks at this stage, a signed hash of $M_n$, a random number (n) (used as a sequence number), and a public key of object receiver 540

($K_{540}$) are also sent to object sender 530. These are encrypted with the public key of object sender 530:

$$E_{530}\{M_n, S_{540}\{H\{M_n\}\}, n, K_{540}\} \qquad (1).$$

Upon reception, object sender 530 decrypts the message using its private key:

$$D_{530}\{E_{530}\{M_n, S_{540}\{H\{M_n\}\}, n, K_{540}\} \qquad (2).$$

Object sender 530 then verifies the sender of the order request using the public key of object receiver 540:

$$V_{540}\{S_{540}\{H\{M_n\}\}\} \qquad (3).$$

Object sender 530 starts the initialization process by defining a handling policy (P), which is a listing of context parameters, defining a statement of expected state on delivery ($M_{n+1}$), and generating a key pair for the seal. The handling policy is encrypted with the private key of the seal to avoid electronic tampering. The seal is then initialized with its private key (in protected memory), the handling policy, the public key of object receiver 540 (for communicating status updates to object receiver 540 with end-to-end authentication), and the expected state on delivery, which is hashed and signed by the private key of object sender 530:

$$\{P, n, S_{530}\{H\{M_{n+1}\}\}, K_{540}, M_{n+1}\} \qquad (4).$$

Object sender 530 then responds to object receiver 540 by sending a status response that includes the public key of the seal to object receiver 540.

Applying the seal to the item triggers the sensors of object monitoring system 520 to perform the first check in order to have an initial seal state ($M_{N+2}$). This also triggers a process of encryption and signing of the initialization information and the initial sealed state, respectively:

$$E_{520}\{P, n, S_{530}\{H\{M_{n+1}\}\}\}, E_{540}\{M_{n+1}\},$$
$$S_{520}\{H\{M_{n+2}\}\}, M_{n+2} \qquad (5).$$

The seal can be opened by parties that can respond to a challenge by the object monitoring system, such as object sender 530 and object receiver 540, as their public keys are known by object monitoring system 520.

A status query may be similar to an order. However, object receiver 540 may directly contact object monitoring system 520, having received its public key. Additionally, object receiver 540 may use checkpoint 550. In certain implementations, checkpoint 550 is an intermediary actor that forwards object and/or object monitoring system status to object sender 530 or object receiver 540 upon request. $E_{530}$ would, therefore, be replaced with $E_{520}$, an operation on the object monitoring system itself, in (1), (2), and (3).

Queries of the object status may be performed. Following an authorized party query or an internally scheduled query, object monitoring system 520 does a poll of its sensors and compares the results with the preferred context parameters specified in the handling policy (P). Object monitoring system 520 then updates the last status ($M_n$) with the current status ($M_{n+q}$), where q is equal to the sequence number of the query.

There may be various context states that describe the seal. These may be specified in $M_{n+q}$. In one implementation, there are three states: 1) valid; 2) degraded; and 3) broken. Valid indicates that the current context matches the handling policy and, thus, that the seal is intact. Degraded indicates that the current context does not fully meet the handling policy, but is within an acceptable bound. For instance, the seal is intact, but there has been a possible tampering attempt (e.g., the objects are not being handled by an authorized party). Broken indicates that the current context does not meeting the handling policy.

When the seal is broken, relevant information may be wiped from memory of object monitoring system 520. When this information is not present, object receiver 540 knows that the seal around the goods has been broken.

Object monitoring system 520 can also record the current handling party and label them as authorized or unauthorized (e.g., unknown or black-marked). A higher-level notification is given when the sealed item is being handled by an unauthorized party.

There are typically two types of status operations that send a status response to an authorized party. The first is a response to the authorized party following a status query. It is authenticated with a signature of the seal ($S_{520}$). Additionally, depending on the policy, the status may be encrypted with the public key of the authorized party before forwarding. This is similar to forwarding the result of the crypto procedure in (5), where q=2:

$$E_{540}\{S_{520}\{H\{M_{n+q}\}\}, M_{n+q}\} \qquad (6);$$

$$V_{550}\{E_{540}\{S_{520}\{H\{M_{n+q}\}\}, M_{n+q}\}\} \qquad (7);$$

$$D_{540}\{S_{520}\{H\{M_{n+q}\}\}\} \qquad (8); \text{ and}$$

$$V_{540}\{H\{M_{n+q}\}\} \qquad (9).$$

The second status response is when the object is physically delivered. The current handling party is set to "authorized" if object receiver 540 provides its public key ($K_{540}$) (i.e., it responds to the object monitoring system's challenge). If the handling party is set to "authorized," object receiver 540 may then determine whether the seal is still valid. If the seal is not valid, the object receiver may query the object monitoring system for the reason for seal breach (e.g., breach due to predetermined condition violation or breach to due attack). In the case of severe attacks on the object monitoring system, however, information might be lost. Without $K_{540}$, however, operation (8) is not possible. If operation (8) is not possible, a notification is issued by object monitoring system 520.

Other implementations, however, do not have to use a public key/private key approach. For example, the seal challenge may be based on a symmetric key approach. This may entail an earlier exchange of the object monitoring system's secret key with object sender 530 and object receiver 530, over a secure channel.

The seal created by object sender 530 for the object 510 may be viewed as a contract (or in some cases, a condition of a contract) between object sender 530 and object receiver 540. That is, the seal states the terms and conditions under which the authenticity and integrity of object can be asserted. System 500 also provides logic for determining and presenting the "protection state" of the object.

Figure 6:
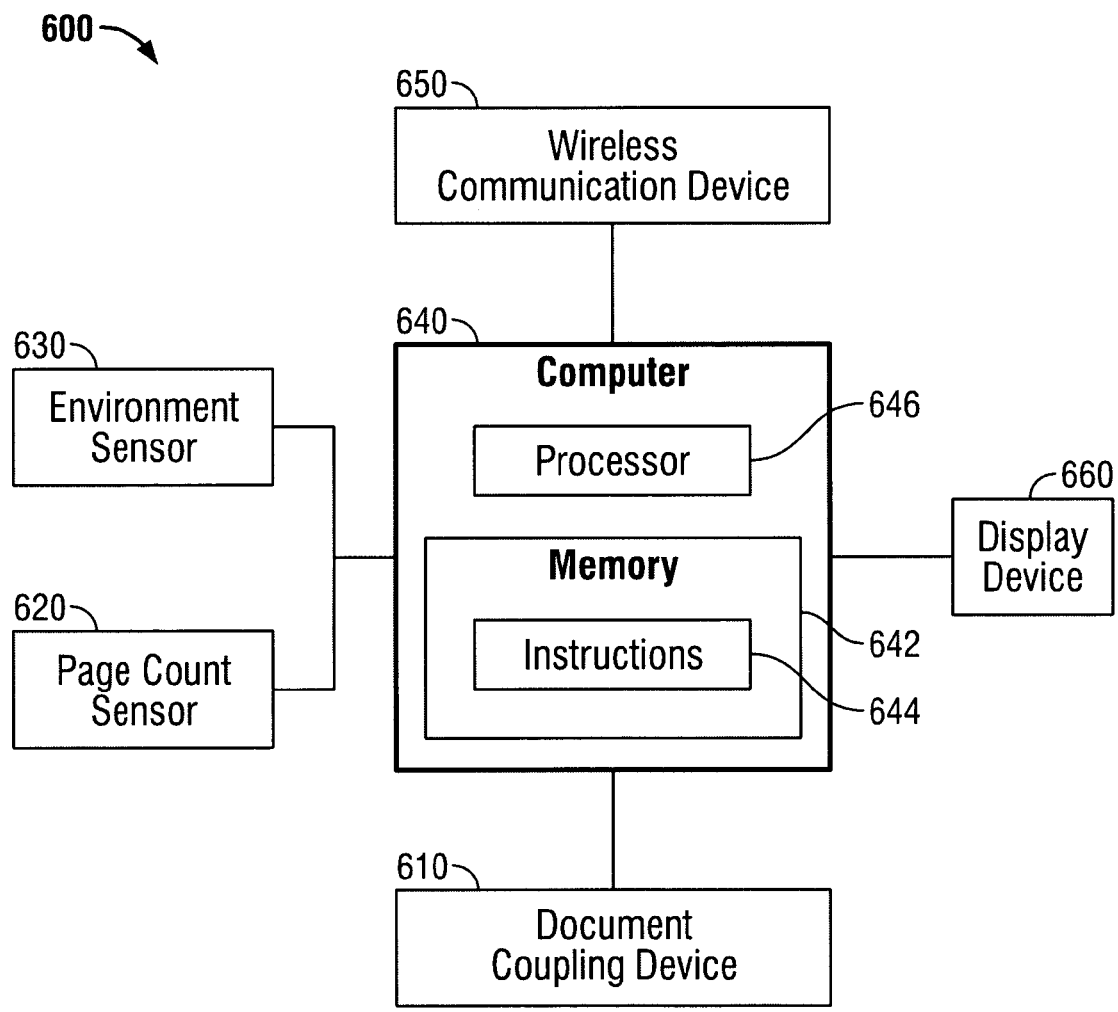
FIG. 6 is a block diagram illustrating another object monitoring system.

FIG. 6 illustrates another implementation of an object monitoring system 600. Object monitoring system 600 is particularly adapted for monitoring physical documents, another type of object that may be managed. As illustrated, object monitoring system 600 includes a document coupling device 610, a page count sensor 620, an environment sensor 630, a computer 640, a wireless communication device 650, and a display device 660.

Document coupling device 610 is operable to physically couple object monitoring system 600 to a physical version of a document. Document coupling device 610 may, for example, be a staple, a paper clip, or a binder clip. Implementing the document coupling device as a document binding apparatus has the advantage of incorporating document management functionality into an apparatus that is already in common use with documents. Thus, users are not burdened with additional interactions with the document.

Page count sensor 620 is operable to sense the number of pages in a document. The pages may be viewed as separate objects to be monitored, and/or or the document may be viewed as an object to be monitored. One example of page count sensor 620 is a capacitive device that uses the pages of the document as the dielectric. Thus, the more pages a document contains the lower the capacitance will be and the higher the voltage across the capacitor will be. Various electrical properties, such as, for example, voltage, charge, or current, may be measured to determine the capacitance and, hence, number of pages. An implementation of a capacitive device will be discussed in more detail below. Another example of page count sensor 620 is a light transmission/reception system. In such a system, a light (e.g., from an LED) is transmitted through the pages of a document. Based on the strength of the light after it has traversed the document, a determination may be made of the number of pages of the document. Page count sensor 620 generates a signal representative of the number of pages sensed.

Environment sensor 630 may be any appropriate sensor for sensing a condition in, on, or in the vicinity of a document, conditions in the vicinity of the document being part of the document's environmental state. Examples of an environment sensor include a temperature sensor (e.g., resistive temperature device or thermocouple), an illumination sensor, (e.g., bolometer or charge-coupled device), a noise sensor (e.g., a microphone), and a movement sensor (e.g., accelerometer). Environment sensor 630 generates a signal representative of the environment condition sensed.

Computer 640 is coupled to page count sensor 620 and environment sensor 630, and includes memory 642 and a processor 646. Memory 642 may include flip-flops, random access memory (RAM), read-only memory (ROM), compact-disk read-only memory (CD-ROM), and/or any other appropriate device for storing information. Memory 642 includes instructions 644, according to which processor 646 operates. Processor 646 may be a complex instruction set computer (CISC), a reduced instruction set computer (RISC), a field programmable gate array (FPGA), or any other appropriate device for manipulating information in a logical manner. In particular implementations, computer 640 may be based on the Smart-Its Particle platform from Telecooperation Office (TecO) at the University of Karlsruhe, Germany. This platform may also provide functionality such as sensing, computing, and wireless communication. In certain implementations, computer 640 may be a PC-based platform.

Wireless communication device 650 is coupled to computer 640 to wirelessly send data from and to wirelessly receive data for computer 640. Wireless communication device 650 may include a wireless transmitter, a wireless receiver, a wireless transceiver, and/or any other appropriate device for wireless sending and/or receiving information. Wireless communication device 650 may operate in any appropriate electromagnetic regime (e.g., RF or IR) and according to any appropriate protocol (e.g., IEEE 802.11, Bluetooth™, cellular, or IrDA). In particular implementations, wireless communication device 650 may sense the location of a document by detecting a wireless communication object (e.g., a gateway). In other implementations, wireless communication device 650 may sense the location of a document by receiving a location signal generated by another system component (e.g., a document tracking device). A document tracking device may, for example, be a computer that stores the status of a physical document as communicated by object monitoring system 600. A document tracking device may also store a non-physical (e.g., electronic) version of the physical document (e.g., a file server).

Display device 660 is also coupled to computer 640. Display device 660 is operable to provide a visual indication of the status of object monitoring system 600 and/or the monitored document. Display device 660 may include light emitting diodes (LEDs), a liquid crystal display (LCD), a cathode ray tube (CRT) display, and/or any other appropriate device for providing visual information.

The active components of document monitoring device 600 may be powered by any appropriate power source. In certain implementations, a AAA-size battery may be used. Such a power source may provide operability for approximately one year if physical triggers, such as, for example, document movement, are used for measuring and communicating.

In one mode of operation, the operations of object monitoring system 600 are initiated by instructions received through wireless communication device 640. The instructions may inform the object monitoring system of when to begin and end operations (e.g., a time period), the parameters of the monitored document (e.g., page type), the allowable state(s) of the monitored document, and the state data to be communicated to a document tracking device.

After being coupled to the document to be monitored (e.g., after a document is printed), object monitoring system 600 begins monitoring the document using page count sensor 620 and environment sensor 630. The sensors may make their measurements on a periodic, aperiodic, event-driven basis, or other appropriate basis.

When sensors 620, 630 perform a measurement, they generate a signal representative thereof. Computer 640 receives the signals representing the measurements from the sensors and determines the sensed status. Computer 640 sends representations of the determined status to wireless communication device 650, for conveyance to the document tracking device. Computer 640 also determines whether a status is allowable. For example, the computer may determine that the document being monitored does not have the appropriate number of pages or that an environmental condition (e.g., illumination) is out of bounds. Illumination, for example, may be out of bounds if the document is placed in a bag or briefcase.

If the status is not allowable, the computer generates an indication that is presented by display device 660. The indication may be the activation of a light, the display of a text message, the display of a graphic symbol, or any other appropriate indicator. Computer 640 also sends a signal indicating that an unallowable status has occurred to wireless communication device 650, for conveyance to the document tracking device.

Object monitoring system 600 may continue to monitor a document for any appropriate period of time. For example, the object monitoring system may monitor the document until an unallowable status is encountered or until a designated period of time has expired. The end of the monitoring may be specified in the instructions received though wireless communication device 650.

In other modes of operation, the object monitoring system 600 may also receive document meta-data (e.g., author, title, creation date, revision history, theme, and/or keywords) from the document tracking device. Computer 640 may store the data in memory 642 and provide the data on display device 650. Additionally, object monitoring system 600 may also receive state data for a non-physical version of the document from the document tracking device. The computer may use the state data of the non-physical version to validate the physical version of the document. For example, if the state data of the non-physical version indicates that it has been edited recently, computer 640 may determine that the physical version is no longer valid.

Although FIG. 6 illustrates one example of an object monitoring system, other implementations may include fewer, additional, and/or a different arrangement of components. For example, some implementations may not include a page count sensor and/or an environmental sensor. As an additional example, some implementations may include a computer for each of the sensors. As a further example, some implementations may not include a display device. As another example, some or all of the instructions may be encoded on the processor.

In particular implementations, the page count sensor may include the document coupling device. For example, if the document coupling device is a binder clip, the page count sensor may use the sides of the bind clip as capacitive plates. The pages of the physical document to be monitored would then act as the dielectric. A voltage on the plate may then be measured to determine the number of pages in the physical document.

In certain implementations, an object monitoring system may include a user input device (e.g., a button, a keypad, or a touchpad). By activating the input device, a user could indicate one or more of a variety of procedures. For example, activation could indicate a request for document data, from the object monitoring system and/or a document tracking device. As another example, activation could indicate that an event has occurred for the physical version of a document. The activation may be correlated with other data regarding the document to complete and/or determine a procedure.

As one example, activating the input device could be used for notification and confirmation in a document signature process. Typically, such processes involve a number of people signing a document. By activating the input device, each signatory may indicate that a particular signature has been performed for the monitored document. Furthermore, by tracking the location of the monitored document, the signatory may be determined and/or confirmed.

As another example, the input device may be useful where rules for a document may be altered in situations that can be better recognized by a user interacting with the physical document. For instance, activating the input device could establish the right to edit a non-physical version of a document. This could, for example, be applicable in the situation where a first user is currently editing the non-physical version of the document, a second user has the physical document with the object monitoring system attached and wants to edit the document, but the first user has imposed a restriction that locks the non-physical version. By activating the input device, the lock of the first user is released by demanding that the first user save and close the document or by a document management engine executing this automatically.

As a further example, activating the input device may establish a lock before the editing process. For instance, if a user has the physical document with the attached object monitoring system and activates the input device, no one can revoke the right to edit the non-physical version of the document, because the user has authorized the editing by providing proof of being in possession of the physical version of the document.

Figure 7A:
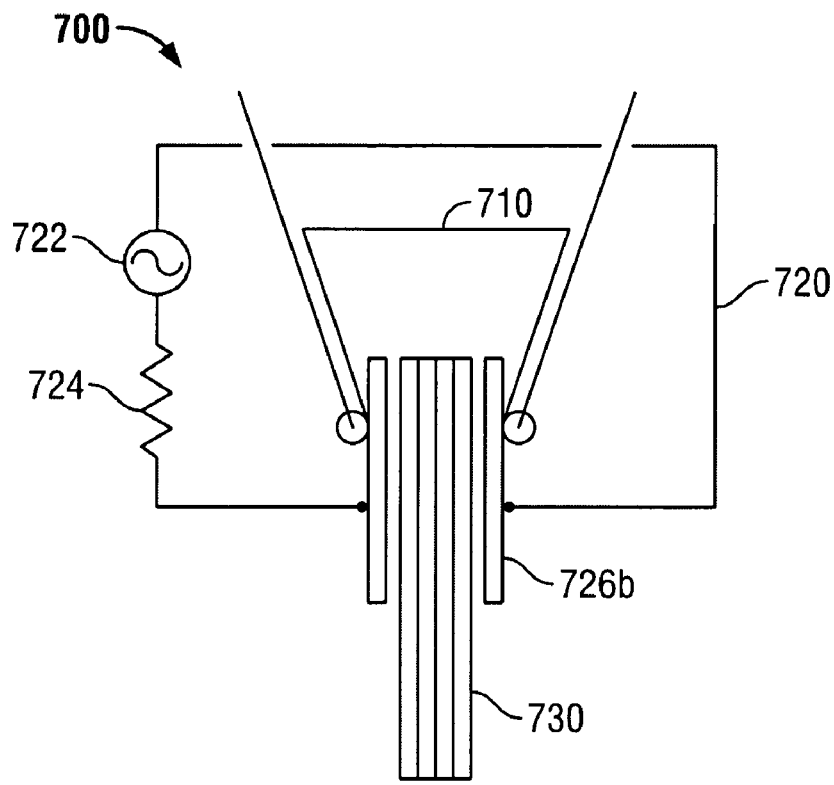
FIGS. 7A–C illustrate an example of the object monitoring system in FIG. 6.
Figure 7B:
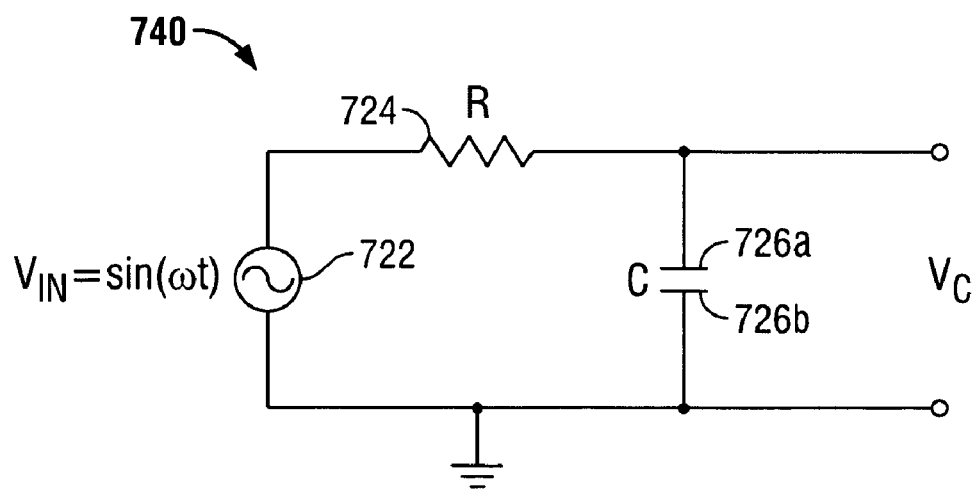
Figure 7C:
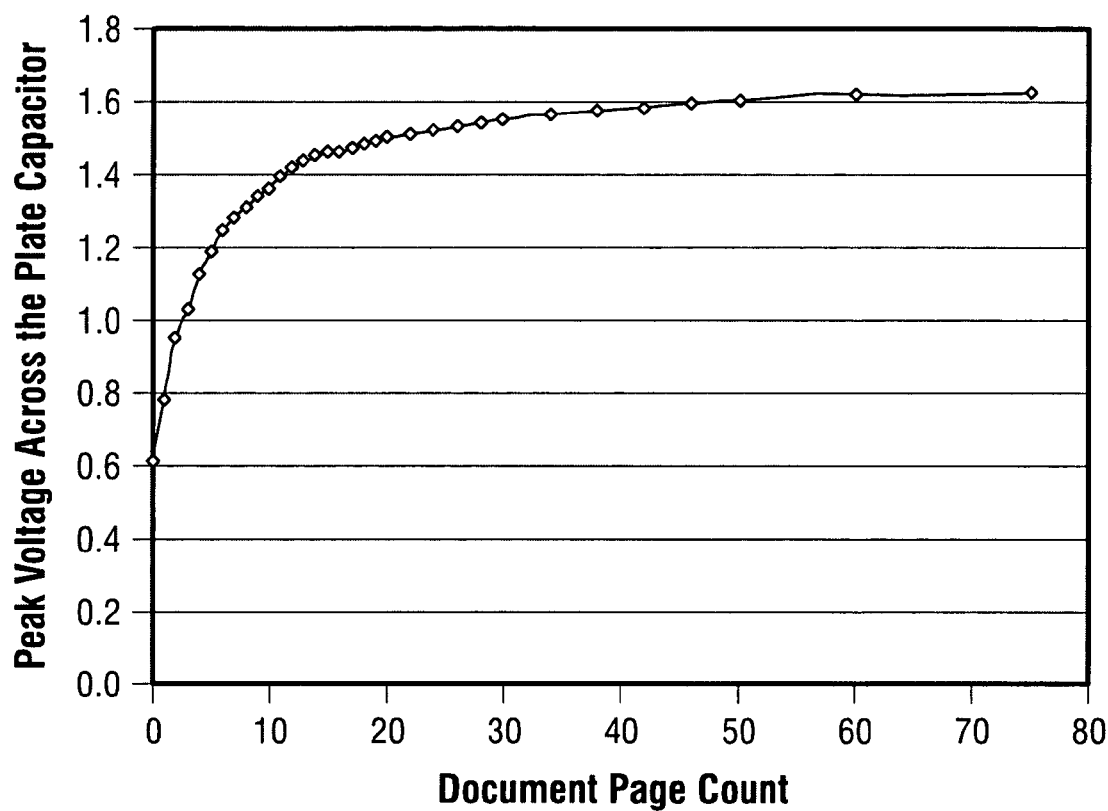

FIGS. 7A-C illustrate an object monitoring system 700. Object monitoring system 700 is one example of object monitoring system 600.

As seen in FIG. 7A, object monitoring system 700 includes a binder clip 710 and an electronic circuit 720. Binder clip 710 facilitates coupling of monitoring system 700 to a document 730. Binder clip 710 may or may not serve as the principle binding for the document. Electronic circuit 720 includes a sinusoidal voltage input 722, a resistor 724, and capacitive plates 726. The capacitive plates are coupled to binder clip 710 and also facilitate coupling of monitoring device 700 to the document. Capacitive plates 726 may act as a capacitor by themselves or when coupled to document 730.

FIG. 7B illustrates a circuit diagram 740 of electronic circuit 720. As can be seen, circuit 720 has sinusoidal voltage input 722, resistor 724, and capacitive plates 726. The capacitance between the plates may be expressed as:

$$C = \varepsilon_0 * \varepsilon_r * \frac{A}{d}, \tag{10}$$

where
  $\epsilon_o$=dielectric coefficient,
  $\epsilon_r$=relative dielectric coefficient (~5.6 for paper),
  A=the area of the plates, and
  d=the distance between the plates.

Because the number of pages in document 730 affects the distance and, hence, the capacitance, measuring the voltage across capacitive plates 726 provides an indication of the number of document pages. The relationship of the voltage across capacitive plates 726 to voltage input 722 may be expressed as:

$$V_C = V_{IN} * \frac{1}{\sqrt{R^2 * \omega^2 * C^2 + 1}}. \tag{11}$$

FIG. 7C shows the voltage across capacitive plates for one implementation. In this implementation, the input voltage was 1.65 V, the frequency of the input voltage was 100 kHz, and the resistance of the resistor was 20 kΩ.

As can be seen, the voltage across the capacitive plates due to fewer or additional pages in a document varies the most when a document contains only a few pages. However, the voltage across the capacitive plates due to fewer or additional pages does continue to change even for documents with many tens of pages. Storing a representation of the curve may assist in determining page count and/or in determining changes in page count. Note that the accuracy of the page count measurement may degrade for documents containing pages of varying thickness. Also, the object monitoring system may have to be adjustable, because paper weight may vary from document to document.

A object monitoring system may also recognize other conditions with such a document coupling device. For example, the object monitoring system may recognize that the clip is empty or that the clip is open.

A variety of implementations have been described in detail, and a number of other implementations have been mentioned or suggested. Furthermore, a variety of additions, deletions, modifications, and substitutions to these implementations may be made while still achieving object management. For these reasons, the scope of the invention is to be measured by the following claims, which may encompass one or more of the implementations.

What is claimed is:

1. A system for object management, the system comprising:
an object monitoring system comprising a computer operable to:
determine whether if the signal representing the presence of at least one object to be monitored has been received;
if a signal representing a presence of at least one object to be monitored has been received, determine whether a predetermined quantity of objects is present;
determine whether if the signal representing the state of at least one object to be monitored has been received; and
if a signal representing a state of at least one object to be monitored has been received, determine whether at least one object has a predetermined state.

2. The system of claim 1, wherein the object monitoring system further comprises an object coupling device.

3. The system of claim 1, wherein the object monitoring system further comprises:
a first sensor system, the first sensor system operable to sense the presence of at least one object to be monitored and to generate a signal representative thereof; and
a second sensor system, the second sensor system operable to sense the state of at least one object to be monitored and to generate a signal representative thereof.

4. The system of claim 3, wherein the first sensor system comprises a plurality of radio frequency identification transponders and a radio frequency identification reader.

5. The system of claim 3, wherein the first sensor system comprises an imaging device.

6. The system of claim 3, wherein the second sensor system comprises a sensor operable to detect an environmental condition in a vicinity of at least one object.

7. The system of claim 6, wherein the environmental condition comprises temperature.

8. The system of claim 3, wherein the second sensor system comprises a location sensor.

9. The system of claim 3, wherein the computer is further operable to determine the predetermined quantity of objects and the predetermined object state based on signals from the first and second sensor systems.

10. The system of claim 1, wherein the computer is further operable to:
determine whether a signal indicating the predetermined object state has been received; and
if the signal has been received, determine the predetermined object state based on the signal.

11. The system of claim 1, wherein the computer is further operable to determine the relative positions of objects.

12. The system of claim 1, wherein the computer is further operable to determine whether monitoring should continue.

13. The system of claim 12, wherein the computer stops monitoring if a predetermined period of time expires.

14. The system of claim 1, wherein, the predetermined quantity of objects and the predetermined object state are expressed as rules.

15. The system of claim 1, further comprising a wireless communication device coupled to the computer, the wireless communication device operable to send data from and receive data for the computer.

16. The system of claim 15, wherein the computer authenticates a destination before sending data thereto.

17. The system of claim 15, wherein sent data comprises the quantity of objects present and the at least object state.

18. The system of claim 15, wherein received data comprises an allowable object state.

19. The system of claim 15, wherein sent data comprises an alert indicating that at least one monitored object does not have a predetermined status.

20. The system of claim 15, further comprising a second object monitoring system, the second object monitoring system comprising:
a sensor system operable to sense a presence of at least one object to be monitored and to generate a signal representative thereof;
a second computer coupled to the sensor system, the second computer operable to determine whether a predetermined quantity of objects is present; and
a second wireless communication device coupled to the second computer, the second wireless communication device operable to send data from and receive data for the second computer.

21. The system of claim 20, wherein:
the received data comprises an object status request; and
the sent data comprises object status.

22. The system of claim 1, wherein the object monitoring system is adapted to be located in the vicinity of an object to be monitored.

23. A method for object management at an object monitoring system, the method comprising:
determining whether a signal representing a presence of at least one object to be monitored has been received;
determining whether a signal representing a state of at least one object to be monitored has been received;
if the signal representing the presence of at least one object to be monitored has been received, determining whether a predetermined quantity of objects is present; and
if the signal representing the state of at least one object to be monitored has been received, determining whether at least one object has a predetermined state.

24. The method of claim 23, further comprising:
sensing a presence of at least one object to be monitored; and
sensing a state of at least one object to be monitored.

25. The method of claim 24, wherein sensing a presence of at least one object to be monitored comprises receiving a response from at least one radio frequency identification transponder.

26. The method of claim 23, wherein determining whether at least one object has a predetermined state comprises determining relative positions of objects.

27. The method of claim 23, wherein determining whether at least one object has a predetermined state comprises determining an environmental condition in a vicinity of at least one object.

28. The method of claim 23, further comprising determining whether monitoring should continue.

29. The method of claim 23, further comprising determining the predetermined quantity of objects and the predetermined object state by sensing a presence of at least one object to be monitored and sensing a state of at least one object to be monitored.

30. The method of claim 23, further comprising wirelessly communicating data.

31. The method of claim 30, further comprising authenticating a destination before sending data thereto.

32. The method of claim 30, wherein sent data comprises the quantity of objects present and the state of at least one object.

33. The method of claim 30, wherein sent data comprises an alert indicating that at least one monitored object does not have a predetermined status.

34. The method of claim 30, wherein received data comprises an allowable object status.

35. The method of claim 30, wherein received data comprises an indication of a quantity of objects sensed by a second object monitoring system.

36. The method of claim 35, wherein sent data comprises an object status request.

37. A system for object management, the system comprising:
an object monitoring system comprising:
a first sensor system, the first sensor system operable to sense a presence of at least one object to be monitored and to generate a signal representative thereof,
a second sensor system, the second sensor system operable to sense a state of at least one object to be monitored and to generate a signal representative thereof,
a computer coupled to the first sensor system and the second sensor system, the computer operable to:
determine whether the signal representing the presence of at least one object to be monitored has been received;
if the signal representing the presence of at least one object to be monitored has been received, determine whether a predetermined quantity of objects is present, wherein the predetermined quantity of objects is expressed a rule;
determine whether the signal representing the state of at least one object to be monitored has been received; and
if the signal representing the state of at least one object to be monitored has been received, determine whether at least one object has a predetermined state, wherein the predetermined object state is expressed as a rule, and
a wireless communication device coupled to the computer, the wireless communication device operable to send data from and receive data for the computer.

38. The system of claim 37, wherein the object monitoring system further comprises an object coupling device.

39. The system of claim 37, wherein the second sensor system comprises a sensor operable to detect an environmental condition in the vicinity of at least one object.

40. The system of claim 37, wherein the computer is further operable to determine the predetermined quantity of objects and the predetermined object state based on signals from the sensor systems.

41. The system of claim 37, wherein the computer authenticates a destination before sending data thereto.

42. The system of claim 37, wherein received data comprises the predetermined object state.

43. The system of claim 37, wherein sent data comprises an alert indicating that at least one monitored object does not have a predetermined status.

44. The system of claim 37, further comprising a second object monitoring system, the second object monitoring system comprising:
a third sensor system, the third sensor system operable to sense a presence of at least one object to be monitored and to generate a signal representative thereof;
a second computer, the second computer coupled to the third sensor system, the second computer operable to determine whether a predetermined quantity of objects is present; and
a second wireless communication, the second wireless communication device coupled to the second computer, the second wireless communication device operable to send data from and receive data for the second computer.

45. The system of claim 44, wherein:
the received data comprises an object status request; and
the sent data comprises object status.

* * * * *